United States Patent
Liu et al.

(10) Patent No.: US 12,269,013 B2
(45) Date of Patent: Apr. 8, 2025

(54) BINDER COMPOSITION FOR ENHANCED CATALYST WASHCOAT ADHESION

(71) Applicant: BASF MOBILE EMISSIONS CATALYSTS LLC, Iselin, NJ (US)

(72) Inventors: Yi Liu, Huntsville, AL (US); Yipeng Sun, Iselin, NJ (US); Donald Reeder, Huntsville, AL (US); Brian T. Jones, Huntsville, AL (US); Andreas R. Munding, Huntsville, AL (US); Oliver Seel, Nienburg/Weser (DE); David Schlereth, Ludwigshafen (DE); Hao Li, Nienburg/Weser (DE)

(73) Assignee: BASF Mobile Emissions Catalysts LLC, Iselin, NJ (US)

( * ) Notice: Subject to any disclaimer, the term of this patent is extended or adjusted under 35 U.S.C. 154(b) by 797 days.

(21) Appl. No.: 17/593,163

(22) PCT Filed: Mar. 12, 2020

(86) PCT No.: PCT/US2020/022274
§ 371 (c)(1),
(2) Date: Sep. 10, 2021

(87) PCT Pub. No.: WO2020/186000
PCT Pub. Date: Sep. 17, 2020

(65) Prior Publication Data
US 2022/0105493 A1    Apr. 7, 2022

Related U.S. Application Data

(60) Provisional application No. 62/818,378, filed on Mar. 14, 2019.

(30) Foreign Application Priority Data

May 20, 2019 (EP) .................................. 19175283

(51) Int. Cl.
*B01J 23/10* (2006.01)
*B01D 53/94* (2006.01)
(Continued)

(52) U.S. Cl.
CPC .............. *B01J 23/10* (2013.01); *B01D 53/94* (2013.01); *B01J 21/04* (2013.01); *B01J 21/066* (2013.01);
(Continued)

(58) Field of Classification Search
None
See application file for complete search history.

(56) References Cited

U.S. PATENT DOCUMENTS

| | | | |
|---|---|---|---|
| 7,521,087 B2 | 4/2009 | Rosynsky et al. | |
| 8,815,189 B2 | 8/2014 | Arnold et al. | |

(Continued)

FOREIGN PATENT DOCUMENTS

| | | |
|---|---|---|
| EP | 2298444 A1 | 3/2011 |
| WO | WO 96-16004 A2 | 5/1996 |

(Continued)

OTHER PUBLICATIONS

European Search Report for EP Patent Application No. 19175283.1, Issued on Nov. 25, 2019, 3 pages.
(Continued)

*Primary Examiner* — Jelitza M Perez
(74) *Attorney, Agent, or Firm* — DLA Piper LLP (US)

(57) ABSTRACT

The present disclosure provides binder compositions formed with a plurality of binder materials having differing mean particles, the binder compositions being useful to improve washcoat adhesion on a substrate. Adhesion can be improved related to an increase in the binder concentration without a significant or substantial increase in associated viscosity. Such binder compositions can comprise a first (Continued)

binder material formed of a plurality of particles having a first mean particle size and a second binder material formed of a plurality of particles having a second mean particle size, wherein a ratio of the first mean particle size to the second mean particle size about 2 or greater. The present disclosure further provides catalyst compositions, catalyst articles, and emission systems incorporating the binder compositions.

18 Claims, 5 Drawing Sheets

(51) Int. Cl.
  *B01J 21/04*  (2006.01)
  *B01J 21/06*  (2006.01)
  *B01J 35/00*  (2006.01)
  *B01J 35/40*  (2024.01)
  *B01J 35/56*  (2024.01)
  *B01J 37/00*  (2006.01)
  *B01J 37/02*  (2006.01)
  *F01N 3/28*  (2006.01)

(52) U.S. Cl.
  CPC ............... *B01J 35/19* (2024.01); *B01J 35/40* (2024.01); *B01J 35/56* (2024.01); *B01J 37/0009* (2013.01); *B01J 37/0244* (2013.01); *F01N 3/2803* (2013.01); *B01D 2255/9155* (2013.01); *F01N 2370/02* (2013.01)

(56) References Cited

U.S. PATENT DOCUMENTS

| | | |
|---|---|---|
| 9,266,092 B2 | 2/2016 | Arnold et al. |
| 9,981,258 B2 | 5/2018 | Xue et al. |
| 2011/0045968 A1 | 2/2011 | Akamine et al. |
| 2011/0252773 A1* | 10/2011 | Arnold ............... B01D 46/2429 60/297 |
| 2011/0271664 A1 | 11/2011 | Boorse et al. |
| 2015/0111727 A1 | 4/2015 | Nagashima |
| 2018/0008973 A1 | 1/2018 | Gramiccioni et al. |
| 2018/0021768 A1 | 1/2018 | Chandler et al. |
| 2018/0104670 A1 | 4/2018 | Stabler et al. |

FOREIGN PATENT DOCUMENTS

| | | |
|---|---|---|
| WO | 2013/008564 A1 | 1/2013 |
| WO | WO-2016/115451 A1 | 7/2016 |

OTHER PUBLICATIONS

Internaitonal Search Report dated Jun. 30, 2020, PCT/US2020/022274.

Extended European Search Report dated Dec. 14, 2022, of counterpart European Patent Application No. 20769970.3.

* cited by examiner

BINDER COMPOSITION FOR ENHANCED CATALYST WASHCOAT ADHESION

CROSS-REFERENCE TO RELATED APPLICATIONS

This application is a national stage filing under 35 U.S.C. § 371 of International Application No. PCT/US2020/022274, filed on Mar. 12, 2020, which claims the benefit of priority to U.S. Provisional Application No. 62/818,378, filed Mar. 14, 2019, and to European Application No. 19175283.1, filed May 20, 2019. The contents of these applications are each incorporated herein by reference in their entirety.

FIELD OF THE INVENTION

The present invention relates generally to the field of compositions useful in forming catalysts, as well as catalytic articles including such compositions and methods of preparing and using such catalytic articles.

BACKGROUND OF THE INVENTION

Over time, the harmful components of nitrogen oxides ($NO_x$) have led to atmospheric pollution. $NO_x$ is contained in exhaust gases, such as from internal combustion engines (e.g., in automobiles and trucks), from combustion installations (e.g., power stations heated by natural gas, oil, or coal), and from nitric acid production plants.

Various treatment methods have been used for the treatment of $NO_x$-containing gas mixtures to decrease atmospheric pollution. One type of treatment involves catalytic reduction of nitrogen oxides. There are two processes: (1) a nonselective reduction process wherein carbon monoxide, hydrogen, or a lower hydrocarbon is used as a reducing agent; and (2) a selective reduction process wherein ammonia or an ammonia precursor is used as a reducing agent. In the selective reduction process, a high degree of nitrogen oxide removal can be achieved with a small amount of reducing agent.

Catalytic articles useful in providing such catalytic reduction are typically prepared by applying a catalyst material to a substrate, often in the form of a washcoat composition. In order to ensure durability of a catalytic article, it is beneficial for a washcoat composition to remain substantially adhered to the substrate throughout the lifetime of use of the catalytic article with minimal loss.

In order to enhance binding strength between a catalyst washcoat and a substrate, one or more binders may be added to the washcoat composition. Improving washcoat binding to a substrate through the use of binders, however, can be problematic. Increasing the overall binder content in a washcoat composition can significantly increase the total viscosity of the composition, and this in turn can hinder uniform coating of the washcoat composition along the substrate. Non-uniformity of the coating then leads to loss of the washcoat over time. On the other hand, decreasing the overall binder content in a washcoat composition can undesirably reduce the binding strength of the washcoat to the substrate. Reduced binding strength then leads to loss of the washcoat over time. Accordingly, it can be difficult to arrive at a correct binder content in order to achieve suitable loss profiles, and there remains a need in the field for additional binder compositions for use in forming catalytic articles.

SUMMARY OF THE INVENTION

The present disclosure is directed to compositions that are useful in forming catalyst articles. The compositions include a plurality of binders having differing mean particle sizes, the plurality of binders being present in defined ratios. The compositions including the plurality of binders are beneficial for enhancing adhesion of a catalyst washcoat on a substrate. The combination of a plurality of binders as described herein particularly can increase the total binder content that can be utilized without causing undesirable increases in washcoat viscosity. Likewise, the combination of a plurality of binders can improve viscoelastic behavior of the washcoat that is adhered to the substrate therewith.

In one or more embodiments, the present disclosure can relate to a binder composition comprising a plurality of binder materials in defined ratios and sizes. For example, a binder composition can comprise: a first binder material formed of a plurality of particles having a first mean particle size; and a second binder material formed of a plurality of particles having a second mean particle size; wherein a ratio of the first mean particle size to the second mean particle size is about 2 or greater. In further embodiments, the binder composition can be defined in relation to one or more of the following statements, which can be combined in any number and order.

The first binder material and the second binder material are independently selected from the group consisting of alumina-containing materials, silica-containing materials, zirconia-containing materials, ceria-containing materials, lanthana-containing materials, yttria-containing materials, and combinations thereof.

The first binder material is an alumina-containing material, and the second binder material is a zirconia-containing material.

The binder composition further comprises a third binder material formed of a plurality of particles having a third mean particle size, wherein a ratio of the third mean particle size to the first mean particle size is about 2 or greater, or wherein a ratio of the second mean particle size to the third mean particle size is about 2 or greater.

The binder composition further comprising a third binder material formed of a plurality of particles having a third mean particle size, wherein a ratio of the first mean particle size to the third mean particle size is about 2 or greater.

The first mean particle size is about 50 nm to about 1000 nm.

The second mean particle size is about 10 nm to about 500 nm.

The first binder material and the second binder material are present in a concentration ratio of about 0.01 to about 0.5.

One or both of the first binder material and the second binder material is catalytic.

In one or more embodiments, the present disclosure can relate to a washcoat slurry. For example, such washcoat slurry can comprise: a liquid medium; and a binder composition as otherwise described herein. In further embodiments, the washcoat slurry can be defined in relation to one or more of the following statements, which can be combined in any number and order.

The binder composition is present in an amount of about 0.01 to about 1.0 g/in$^3$, and wherein the washcoat slurry has a viscosity at about 300 s$^{-1}$ of about 100 cP or less.

The washcoat slurry has a viscosity at about 300 s$^{-1}$ of about 50 cP or less.

The washcoat slurry further comprises a catalyst material.

In one or more embodiments, the present disclosure can relate to a catalyst article. For example, a catalyst article can comprise a catalyst substrate having a plurality of channels adapted for gas flow, each channel having a wall surface in adherence to a catalytic coating comprising a binder composition as otherwise described herein. In further embodiments, the catalyst article can be defined in relation to one or more of the following statements, which can be combined in any number and order.

The catalytic coating comprises a catalyst material in combination with the binder composition.

The catalyst substrate is a honeycomb comprising a wall flow filter substrate or a flow through substrate.

The catalytic coating is present on the substrate with a loading of at least about 1.0 g/in$^3$.

The catalyst substrate includes a first coating layer of the catalytic coating and includes a second coating layer of a different overall composition overlying at least a portion of the first coating layer of the catalytic coating.

One or both of the following conditions can be met: the first binder material is present in an amount of about 0.1 wt % to about 5 wt % of a total dry gain of the first coating layer of the catalytic coating; the second binder material is present in an amount of about 7 wt % to about 20 wt % of the total dry gain of the first coating layer of the catalytic coating.

In one or more embodiments, the present disclosure can relate to an emission treatment system for treatment of an exhaust gas stream. For example, an emission treatment system can comprise: an engine producing an exhaust gas stream; and a catalyst article as otherwise described herein positioned downstream from the engine and in fluid communication with the exhaust stream.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only, and should not be construed as limiting the invention.

DETAILED DESCRIPTION

Figure 1:
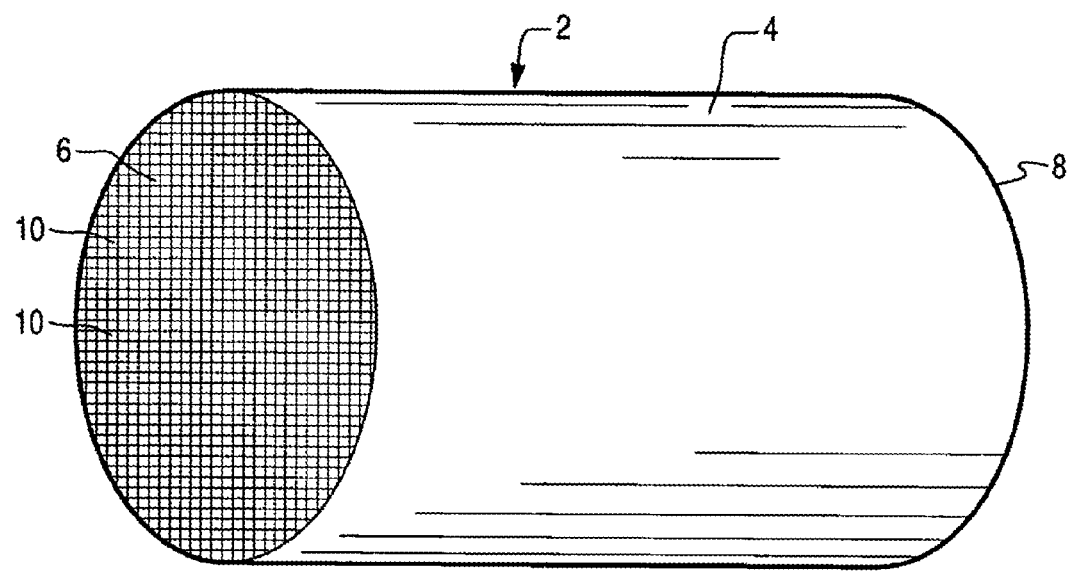
FIG. 1 is a perspective view of a honeycomb-type substrate carrier which may comprise a washcoat composition in accordance with the present invention.

The present disclosure now will be described more fully hereinafter. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art.

As used in this specification and the claims, the singular forms "a," "an," and "the" include plural referents unless the context clearly dictates otherwise.

The term "about" used throughout this specification is used to describe and account for small fluctuations. For example, the term "about" can refer to less than or equal to ±5%, such as less than or equal to ±2%, less than or equal to ±1%, less than or equal to ±0.5%, less than or equal to ±0.2%, less than or equal to ±0.1% or less than or equal to ±0.05%. All numeric values herein are modified by the term "about," whether or not explicitly indicated. A value modified by the term "about" of course includes the specific value.

The present disclosure generally provides compositions that can include a plurality of binders. The compositions may include one or more catalysts, and the one or more catalysts may include one or more of the plurality of binders or may be present in addition to the binders. The present disclosure further provides washcoat compositions, catalyst articles, and catalyst systems comprising such catalyst articles. In one or more embodiments, such articles and systems can comprise three way conversion (TWC) catalyst compositions, diesel oxidation catalysts (DOC), SCR, and/or ammonia oxidation catalysts (AMOx). As such, in certain embodiments, the present compositions can be provided as one coating or a plurality of coatings on a flow through substrate as otherwise described herein. In further embodiments, the present compositions can be provided as one coating or a plurality of coatings on a wall flow substrate as otherwise described herein.

The following terms shall have, for the purposes of this application, the respective meanings set forth below.

As used herein, the term "catalyst" or "catalyst composition" refers to a material that promotes a reaction.

As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine.

As used herein, the term "stream" broadly refers to any combination of flowing gas that may contain solid or liquid particulate matter. The term "gaseous stream" or "exhaust gas stream" means a stream of gaseous constituents, such as the exhaust of a lean burn engine, which may contain entrained non-gaseous components such as liquid droplets, solid particulates, and the like. The exhaust gas stream of a lean burn engine typically further comprises combustion products, products of incomplete combustion, oxides of nitrogen, combustible and/or carbonaceous particulate matter (soot), and un-reacted oxygen and nitrogen.

As used herein, the term "substrate" refers to the monolithic material onto which the catalyst composition is placed, typically in the form of a washcoat containing a plurality of particles containing a catalytic composition thereon. A washcoat is formed by preparing slurry containing a certain solid content (e.g., 10-80% by weight) of particles in a liquid vehicle, which is then coated onto a substrate and dried to provide a washcoat layer.

As used herein, the term "washcoat" has its usual meaning in the art of a thin, adherent coating of a catalytic or other material applied to a substrate material, such as a honeycomb-type carrier member, which is sufficiently porous to permit the passage of the gas stream being treated.

As used herein, the term "catalyst article" refers to an element that is used to promote a desired reaction. For example, a catalyst article may comprise a washcoat containing catalytic compositions on a substrate.

The term "abate" means to decrease in amount and "abatement" means a decrease in the amount, caused by any means.

In one or more embodiments, the present disclosure provides binder compositions. The binder compositions are formed of a plurality of different binder materials. As such, the binder compositions can comprise at least a first binder material and a second binder material. In further embodiments, further binder materials may be used, and such binder materials may be referred to, for example, as a third binder material, a fourth binder material, and so on. The binder materials may differ in one or more aspects. For example, the binder materials may differ in relation to the chemical nature of the materials. In other examples, the binder materials may differ in relation to one or more physical properties, such as a mean size of particles of which the binder materials are formed. In particular embodiments, the binder materials may differ in both chemical structure and one or more physical properties.

In some embodiments, it has been found that particularly desirable effects can be achieved when a binder composition according to the present disclosure comprise at least a first binder material formed of a plurality of particles having a first mean particle size and a second binder material formed of a plurality of particles having a second mean particle size. In embodiments wherein a third binder material, a fourth binder material, or even more binder materials are used, the third binder material can be formed of a plurality of particles having a third mean particle size, the fourth binder material can be formed of particles having a fourth mean particle size, and so on.

As used herein, binder particle size can be a D50 particle size, or the binder particle size can be a mean particle size. The term "mean particle size" is defined as the sum of particle size of all the particles measured divided by the total number of particles. The particle size can be calculated using any suitable means in the art. For example, particle size can be measure using laser diffraction, dynamic light scattering (or photon correlation spectroscopy), sedimentation, image analysis, acoustic spectroscopy, or any other art-recognized method may be used. The particle sizes of the binder component can be measured using a CI LAS 1064 Laser Particle Size Analyzer according to the manufacturer's recommended liquid mode method with a measurement range of 0.04 to 500 microns. For particles <40 nm, the particle size can be measured using a Malvern Zetasizer Pro, which is a high performance two angle particle and molecular size analyzer for the enhanced detection of aggregates and measurement of small or dilute samples, and samples at very low or high concentration using dynamic light scattering with 'NIBS' optics.

The materials from which the binder particles are formed can vary depending upon the specifically desired use therefor. For example, for preparation of a catalyst article, it can be desirable to utilize a binder material that also exhibits catalyst activity. Thus, in some embodiments, one or more binder materials used in the binder composition can be a catalyst material or can otherwise provide a functional role. Likewise, the binder material that is used can be specifically suitable for improved binding of a specific catalyst material to a substrate. In some embodiments, a rare-earth metal oxide can be utilized as a binder material. In example embodiments, a first binder material and a second binder material (and optionally a third binder material or even further binder materials) can be independently selected from the group consisting of alumina-containing materials, silica-containing materials, zirconia-containing materials, ceria-containing materials, lanthana-containing materials, yttria-containing materials, and combinations thereof. In further example embodiments, binder materials used in the compositions of the present disclosure can include binders formed of ceria, zirconia, yttria, lanthana, and combinations thereof.

In one embodiment, the first binder material is an alumina-containing material, and the second binder material is a zirconia-containing material. In one embodiment, the binder composition comprises a first binder material formed of a plurality of particles having a first mean particle size; and a second binder material formed of a plurality of particles having a second mean particle size; wherein a ratio of the first mean particle size to the second mean particle size is about 2 or greater, wherein the first binder material is an alumina-containing material, and the second binder material is a zirconia-containing material. In another embodiment, the binder composition comprises a first binder material formed of a plurality of particles having a first mean particle size; and a second binder material formed of a plurality of particles having a second mean particle size; wherein a ratio of the first mean particle size to the second mean particle size is about 2 or greater, wherein the first binder material is an alumina-containing material, and the second binder material is a zirconia-containing material, wherein the first mean particle size is about 50 nm to about 1000 nm, wherein the second mean particle size is about 10 nm to about 500 nm. In still another embodiment, the binder composition comprises a first binder material formed of a plurality of particles having a first mean particle size; and a second binder material formed of a plurality of particles having a second mean particle size; wherein a ratio of the first mean particle size to the second mean particle size is about 2 or greater, wherein the first binder material is an alumina-containing material, and the second binder material is a zirconia-containing material, wherein the first mean particle size is about 50 nm to about 1000 nm, wherein the second mean particle size is about 10 nm to about 500 nm, wherein the first binder material and the second binder material are present in a concentration ratio of about 0.01 to about 0.5.

In some embodiments, the binder materials used herein are combined in a specific ratio based on the mean particle size of the individual binder material. Unless otherwise stated herein, the terms "first," "second," "third," etc. in relation to an individual binder material are used for clarity only, and it is understood that descriptions made for a "first binder material" and a "second binder material" or further individual binder materials are interchangeable.

As a non-limiting example, a ratio of the mean particle size for a first binder material to the mean particle size for a second binder material can be about 2 or greater. In other words, the mean particle size of the first binder material can be at least 2 times greater (or more) than the mean particle size of the second binder material. In further embodiments, a ratio of the first mean particle size of the first binder material to the second mean particle size of the second binder material can be about 2.5 or greater, about 3 or greater, about 3.5 or greater, about 4 or greater, about 5 or greater, or about 6 or greater. In further example embodiments, a ratio of the first mean particle size of the first binder material to the second mean particle size of the second binder material can be about 1 to about 7, about 1 to about 5, about 1.5 to about 4, or about 2 to about 3.

In embodiments wherein a third binder material is included in the binder composition, the mean particle size of the third binder material can be less than the mean particle size of the first binder material or can be greater than the mean particle size of the third binder material. For example, a ratio of the third mean particle size of the third binder material to the first mean particle size of the first binder material can be about 1.5 or greater, about 2 or greater, about 2.5 or greater, about 3 or greater, about 4 or greater, or about 5 or greater, such as about 1 to about 7, about 1.5 to about 6, or about 2 to about 5. Further, a ratio of the second mean particle size of the second binder material to the third mean particle size of the third binder material can be about 1.5 or greater, about 2 or greater, about 2.5 or greater, about 3 or greater, about 4 or greater, or about 5 or greater, such as about 1 to about 5, about 1 to about 5, about 1.5 to about 4, or about 2 to about 3.

In embodiments wherein a third binder material is included in the binder composition, the mean particle size of the third binder material can be less than the mean particle size of the first binder material or can be greater than the mean particle size of the third binder material. For example, a ratio of the first mean particle size of the first binder material to the third mean particle size of the third binder material can be about 1.5 or greater, about 2 or greater, about 2.5 or greater, about 3 or greater, about 4 or greater, or about 5 or greater, such as about 1 to about 7, about 1.5 to about 6, or about 2 to about 5.

In some embodiments, the second binder material is a combination of two or more different binder materials, each having a mean particle size. In such an embodiment, the second binder material would have a mean particle size.

In some embodiments, at least one binder material can have a mean particle size of about 50 nm to about 1000 nm, about 50 nm to about 750 nm, about 50 nm to about 500 nm, about 50 nm to about 400 nm, about 50 nm to about 300 nm, or about 50 nm to about 250 nm. A binder material having particles in such ranges may, in some embodiments, be referred to as particles having a relatively larger mean particle size.

In further embodiments, at least one binder material can have a mean particle size of 10 nm to about 750 nm, about 10 nm to about 500 nm, about 10 nm to about 250 nm, about 10 nm to about 150 nm, about 15 nm to about 150 nm, or about 20 nm to about 120 nm. A binder material having particles in such ranges may, in some embodiments, be referred to as particles having a relatively smaller mean particle size.

In example embodiments, a first binder material can be formed of a plurality of particles having a first mean size, and a second binder material can be formed of a plurality of particles having a second mean size. The first mean size can be relatively larger than the second mean size, which in turn can be relatively smaller than the first mean size. Preferably, independent of the absolute, mean size of the first binder particles and the absolute, mean size of the second binder particles, the relative sizes of the particles of the first binder material and the particles of the second binder material exhibit the ratios otherwise described herein.

A third binder material, if present, may be a plurality of particles that are larger in size than the first binder material particles according to the ratios provided above or may be a plurality of particles that are smaller in size than the second binder material particles according to the ratios provided above. Alternatively, a third binder material, if present, may be a plurality of particles that are sized so as to be smaller in size than the first binder material particles and larger in size than the second binder material particles so long as the overall size ratios are in accordance to the ratios provided above. More particularly, relative mean sizes for binder material particles may be according to any of the following wherein B1 is the mean particle size of a first binder material, B2 is the mean particle size of a second binder material, and B3 is the mean particle size of a third binder material, and wherein the relative mean sizes are within the ratios otherwise described above: B1>B2; or B2>B1; or B1>B2>B3; or B2>B1>B3; or B2>B3>B1; or B3>B2>B1; or B3>B2>B1; or B1>B3>B2. In one particular embodiment, B1>B2; or B1>B2>B3; or B1>B3>B2.

In addition to the size ratios, the binder composition can be defined, in some embodiments, in relation to a ratio of the concentrations of the individual binder materials that are present. In particular embodiments, it can be desirable for binder material having a relatively smaller mean particle size to be present in a greater concentration than the binder material having a relatively larger mean particle size. For example, the binder material having a relatively larger mean particle size and the binder material having a relatively smaller mean particle size can be present in a concentration ratio of about 0.01 to about 0.95, about 0.01 to about 0.9, about 0.01 to about 0.8, about 0.02 to about 0.6, about 0.02 to about 0.5, or about 0.3 to about 0.5. Such concentration ratios can apply to each additional binder material that is used having a successively relatively larger or successively relatively smaller mean particle size.

Providing for a larger concentration of binder material having a relatively smaller mean particle size can be advantageous for a variety of reasons. For example, in some embodiments, having a greater concentration of binder particles having a relatively smaller mean particle size can be advantageous to increase the total amount of binder material that can be used. Having a higher total amount of binder material can provide for increased binding strength between the catalyst washcoat and the catalyst substrate. Likewise, having a greater concentration of binder particles having a relatively smaller mean particle size can be advantageous to maintain or even reduce the viscosity of the washcoat slurry that is used in applying the catalyst washcoat to the catalyst substrate. This can be advantageous to improve the washcoat uniformity along the length of the substrate and thus avoid having regions of catalyst coating on the substrate that are undesirably thick and/or regions of catalyst coating on the substrate that are undesirably thick. Therefore, the usage of the binder composition of the present disclosure can enable an increase in the binder amount while simultaneously maintaining or even reducing binder washcoat viscosity. This can be beneficial to enlarge the operating window to enhance catalyst adhesion to the substrate.

In further embodiments, the present disclosure can provide a washcoat slurry that is formed of a liquid medium and a binder composition as otherwise described herein. The liquid medium used in the washcoat slurry can particularly be an aqueous medium and can specifically be water. The binder material particles forming the two or more binder materials used in the binder composition can be present in the washcoat slurry alone or in combination with a dedicated catalyst material. The phrase "dedicated catalyst material" can indicate a catalyst material that is present specifically for use as a catalyst in forming a catalyst article and is separate from any binder material used in the binder composition that is also functional as a catalyst material.

The binder composition used in the washcoat slurry can be present in a defined amount while maintaining a desirably low viscosity. Preferably, the binder composition is present in the washcoat slurry in a sufficient concentration to provide for a specified binder loading on a substrate. In describing the quantity of a material (e.g., binder material and/or catalyst material) present in a washcoat slurry, it is convenient to use units of weight of component per unit volume of substrate coated with the washcoat. Therefore, the units grams per cubic inch ("g/in$^3$") and grams per cubic foot ("g/ft$^3$") are used herein to mean the weight of a component per volume of substrate member, including the volume of void spaces of the substrate member. In one or more embodiments, the binder composition can be present in a washcoat slurry in a loading amount of about 0.01 g/in$^3$ to about 1.0 g/in$^3$, about 0.05 g/in$^3$ to about 0.95 g/in$^3$, about 0.1 g/in$^3$ to about 0.9 g/in$^3$, about 0.15 g/in$^3$ to about 0.8 g/in$^3$, or about 0.2 g/in$^3$ to about 0.5 g/in$^3$. In some embodiments, binder content can be defined as a concentration based upon the solids content of the overall slurry. For example, it can be desirable for a washcoat composition including the binder composition to comprise about 10% to about 60%, about 15% to about 50%, or about 20% to about 40% by weight of solids, based on the total weight of the washcoat slurry. Preferably, the binder composition comprises about 1% to about 50%, about 1.5% to about 35%, or about 2% to about 20% by weight of the total solids content of the washcoat slurry. Accordingly, in some embodiments, the binder composition can comprise about 0.1% to about 12%, about 0.2% to about 10%, or about 0.4% to about 8% by weight of the washcoat slurry based upon the total weight of the washcoat slurry. In one embodiment, the washcoat slurry comprises a liquid medium; a binder composition as otherwise described herein, wherein the binder composition is present in an amount of about 0.01 to about 1.0 g/in$^3$, and wherein the washcoat slurry has a viscosity at about 300 s$^{-1}$ of about 100 cP or less.

The present compositions are particularly beneficial in that increased binder loading can be achieved without undesirable increases in the viscosity of the washcoat slurry. Viscosity, for example, can be measured in units of Centipoise (cP) using a Brookfield viscometer at room temperature at a shear rate of about 300 s$^{-1}$. In some embodiments, a washcoat slurry comprising a binder composition as described herein at a loading at noted above can have a viscosity of about 120 cP or less, about 100 cP or less, about 80 cP or less, about 60 cP or less, or about 50 cP or less (e.g., with a lower limit that is greater than one). More particularly, viscosity for a washcoat slurry as noted above can be about 5 cP to about 120 cP, about 5 cP to about 100 cP, about 10 cP to about 80, or about 15 cP to about 60 cP.

As noted above, a washcoat slurry as described herein can include, in addition to the binder materials, one or more catalyst materials. In some embodiments, the binder compositions can be used with one or more catalyst compositions suitable for use in a TWC catalyst and/or a four-way conversion (FWC™) catalyst composition, for example. Catalyst compositions with TWC functionality can include catalyst compositions effective for hydrocarbon (HC) and carbon monoxide (CO) oxidation and NOx reduction in accordance with requirements of regulatory agencies and/or car manufacturers. In this way, platinum group metal components such as platinum, palladium, and rhodium are provided to achieve HC, CO, and NOx conversions and sufficient oxygen storage components (OSC) are provided to achieve sufficient oxygen storage capacity to ensure proper HC, NOx, and CO conversion in an environment of varying A/F (air-to-fuel) ratios. Sufficient oxygen storage capacity generally means that after a full useful life aging as defined by a car manufacturer, the catalyst can store and release a minimum amount of oxygen. For example, a useful oxygen storage capacity can be at least 100 mg per liter of oxygen (such as about 200 mg per liter of oxygen after 80 hours of exothermic aging at 1050° C.). Examples of suitable oxygen storage components include ceria and praseodymia, and such materials be provided as mixed oxides. For example, ceria can be delivered by a mixed oxide of cerium and zirconium, and/or a mixed oxide of cerium, zirconium, and neodymium. For example, praseodymia can be delivered by a mixed oxide of praseodymium and zirconium, and/or a mixed oxide of praseodymium, cerium, lanthanum, yttrium, zirconium, and neodymium. Suitable TWC catalyst compositions can include, for example, those described in U.S. Pat. Nos. 8,815,189, 9,266,092, and 9,981,258, the disclosures of which are incorporated herein by reference.

The binder composition alone (such as when one or more of the binder materials also functions as a catalyst material) or in combination with one or more dedicated catalyst materials can be utilized in a catalyst article in which the binder composition (alone or in combination with a catalyst material) can be provided on a catalyst substrate. According to one or more embodiments, the substrate may be constructed of any material typically used for preparing automotive catalysts and will typically comprise a metal or ceramic honeycomb structure. The substrate typically provides a plurality of wall surfaces upon which a washcoat including at least the binder composition is applied and adhered, thereby acting as a carrier for the applied composition.

Exemplary metallic substrates include heat resistant metals and metal alloys, such as titanium and stainless steel as well as other alloys in which iron is a substantial or major component. Such alloys may contain one or more of nickel, chromium, and/or aluminum, and the total amount of these metals may advantageously comprise at least 15 wt. % of the alloy, e.g., 10-25 wt. % of chromium, 3-8 wt. % of aluminum, and up to 20 wt. % of nickel. The alloys may also contain small or trace amounts of one or more other metals, such as manganese, copper, vanadium, titanium and the like. The surface or the metal carriers may be oxidized at high temperatures, e.g., 1000° C. and higher, to form an oxide layer on the surface of the substrate, improving the corrosion resistance of the alloy and facilitating adhesion of the washcoat layer to the metal surface.

Ceramic materials used to construct the substrate may include any suitable refractory material, e.g., cordierite, mullite, cordierite-α alumina, silicon carbide, silicon nitride, aluminum titanate, zircon mullite, spodumene, alumina-silica magnesia, zircon silicate, sillimanite, magnesium silicates, zircon, petalite, α alumina, aluminosilicates and the like.

Any suitable substrate may be employed, such as a monolithic flow-through substrate having a plurality of fine, parallel gas flow passages extending from an inlet to an outlet face of the substrate such that passages are open to fluid flow. The passages, which are essentially straight paths from the inlet to the outlet, are defined by walls on which a catalytic material is coated as a washcoat (e.g., including the binder composition) so that the gases flowing through the passages contact the catalytic material. The flow passages of the monolithic substrate are thin-walled channels which can be of any suitable cross-sectional shape, such as trapezoidal, rectangular, square, sinusoidal, hexagonal, oval, circular, and the like. Such structures may contain from about 60 to about 1200 or more gas inlet openings (i.e., "cells") per square inch of cross section (cpsi), more usually from about 300 to 600 cpsi. The wall thickness of flow-through substrates can vary, with a typical range being between 0.002 and 0.1 inches. A representative commercially-available flow-through substrate is a cordierite substrate having 400 cpsi and a wall thickness of 6 mil, or 600 cpsi and a wall thickness of 4 mil. However, it will be understood that the invention is not limited to a particular substrate type, material, or geometry.

Figure 2:
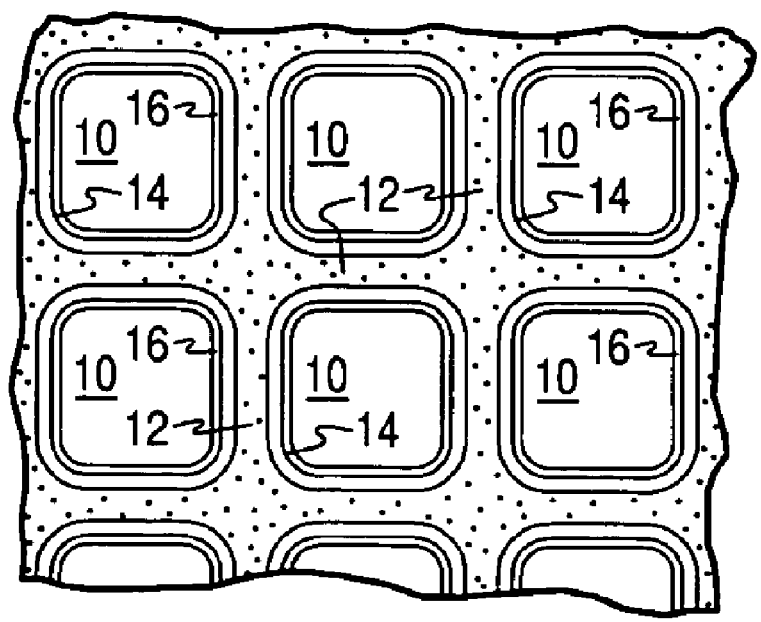
FIG. 2 is a partial cross-sectional view enlarged relative to FIG. 1 and taken along a plane parallel to the end faces of the substrate carrier of FIG. 1 representing a monolithic flow-through substrate, which shows an enlarged view of a plurality of the gas flow passages shown in FIG. 1.

In alternative embodiments, the substrate may be a wall-flow substrate, wherein each passage is blocked at one end of the substrate body with a non-porous plug, with alternate passages blocked at opposite end-faces. This requires that gas flow through the porous walls of the wall-flow substrate to reach the exit. Such monolithic substrates may contain up to about 700 or more cpsi, such as about 100 to 400 cpsi and more typically about 200 to about 300 cpsi. The cross-sectional shape of the cells can vary as described above. Wall-flow substrates typically have a wall thickness between 0.002 and 0.1 inches. A representative commercially available wall-flow substrate is constructed from a porous cordierite, an example of which has 200 cpsi and 10 mil wall thickness or 300 cpsi with 8 mil wall thickness, and wall porosity between 45-65%. Other ceramic materials such as aluminum-titanate, silicon carbide and silicon nitride are also used a wall-flow filter substrates. However, it will be understood that the invention is not limited to a particular substrate type, material, or geometry. Note that where the substrate is a wall-flow substrate, the catalyst composition (e.g., a TWC catalyst and/or a FWC™ catalyst) can permeate into the pore structure of the porous walls (i.e., partially or fully occluding the pore openings) in addition to being disposed on the surface of the walls. FIGS. 1 and 2 illustrate an exemplary substrate 2 in the form of a flow-through substrate coated with a washcoat composition as described herein. Referring to FIG. 1, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 2, flow passages 10 are formed by walls 12 and extend through carrier 2 from upstream end face 6 to downstream end face 8, the passages 10 being unobstructed so as to permit the flow of a fluid, e.g., a gas stream, longitudinally through carrier 2 via gas flow passages 10 thereof. As more easily seen in FIG. 2, walls 12 are so dimensioned and configured that gas flow passages 10 have a substantially regular polygonal shape. As shown, the washcoat composition can be applied in multiple, distinct layers if desired. In the illustrated embodiment, the washcoat consists of both a discrete bottom washcoat layer 14 adhered to the walls 12 of the carrier member and a second discrete top washcoat layer 16 coated over the bottom washcoat layer 14. The present invention can be practiced with one or more (e.g., 2, 3, or 4) washcoat layers and is not limited to the illustrated two-layer embodiment.

Figure 3:
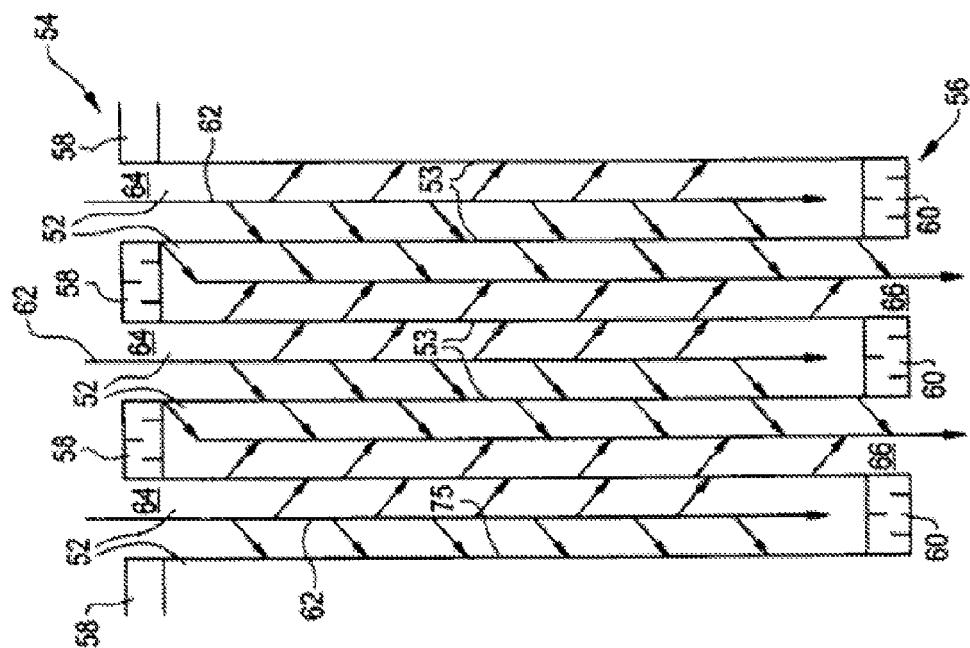
FIG. 3 is a cutaway view of a section enlarged relative to FIG. 1, wherein the honeycomb-type substrate carrier in FIG. 1 represents a wall flow filter substrate monolith.

FIG. 3 illustrates an exemplary substrate 2 in the form a wall flow filter substrate coated with a washcoat composition as described herein. As seen in FIG. 3, the exemplary substrate 2 has a plurality of passages 52. The passages are tubularly enclosed by the internal walls 53 of the filter substrate. The substrate has an inlet end 54 and an outlet end 56. Alternate passages are plugged at the inlet end with inlet plugs 58, and at the outlet end with outlet plugs 60 to form opposing checkerboard patterns at the inlet 54 and outlet 56. A gas stream 62 enters through the unplugged channel inlet 64, is stopped by outlet plug 60 and diffuses through channel walls 53 (which are porous) to the outlet side 66. The gas cannot pass back to the inlet side of walls because of inlet plugs 58. The porous wall flow filter used in this invention is catalyzed in that the wall of said element has thereon or contained therein one or more catalytic materials. Catalytic materials may be present on the inlet side of the element wall alone, the outlet side alone, both the inlet and outlet sides, or the wall itself may be filled with all, or part, of the catalytic material. This invention includes the use of one or more layers of catalytic material that are within the wall or on the inlet and/or outlet walls of the element.

For example, in one embodiment, a catalytic article comprises a catalytic material with multiple layers, wherein each layer has a different catalyst composition. The bottom layer (e.g., layer 14 of FIG. 2) can comprise a first catalyst composition, and the top layer (e.g., layer 16 of FIG. 2) can comprise a second catalyst composition. One or both of the first catalyst composition and the second catalyst composition can include a binder composition as described herein. It is understood in FIG. 2 that the bottom layer 14 and the top layer 16 each can extend fully from a front or inlet end of the substrate to a rear or outlet end of the substrate.

As non-limiting examples, a catalyst material or catalyst composition used herein in forming a catalyst article can comprise any catalyst that is commonly used in, for example, automotive catalysts. In some embodiments, a catalyst article according to the present disclosure can include a binder composition as described herein and one or more catalyst compositions suitable for utilization of the catalyst article as a TWC catalyst, a FWC™ catalyst, a diesel oxidation catalyst (DOC), a gasoline particulate filter (GPF), a lean NOx trap (LNT), an integrated LNT-TWC, and/or as an ammonia oxidation (AMOx) catalyst.

In some embodiments, a platinum group metal (PGM) may be used. In particular, palladium and/or rhodium may be used; however, other PGMs may also (or alternatively) be used. Further, if desired, a specific PGM may be expressly excluded from the present disclosure. When present, a PGM may be present in a loading of at least about 0.5 g/ft$^3$ or at least about 1.0 g/ft$^3$, for example with a maximum loading of about 20 g/ft$^3$. Accordingly, when present, a PGM may be present in an amount of up to about 20 g/ft$^3$. In certain embodiments, the total PGM loading can be about 0.5 g/ft$^3$ to about 20 g/ft$^3$, about 1 g/ft$^3$ to about 10 g/ft$^3$, or about 2 g/ft$^3$ to about 10 g/ft$^3$. In certain embodiments, it can be desirable for a catalyst composition and/or catalyst article of the present disclosure to be substantially free of a PGM. To this end, a catalyst composition may be "substantially free" of a PGM if it includes less than 0.1% by weight PGM or less than 0.01% by weight PGM. Likewise, a catalyst article may be "substantially free" of PGM if it has a PGM loading of less than 0.1 g/ft$^3$ or less than 0.01 g/ft$^3$. Preferably, "substantially free" can mean only a trace amount is present.

In some embodiments, a catalyst composition or catalyst article can be completely free of PGM if desired.

In one or more embodiments, an ammonia oxidation catalyst (AMOx) may be used. AMOx catalysts are taught for instance in U.S. Pub. No. 2011/0271664, the disclosure of which is incorporated herein by reference. An ammonia oxidation (AMOx) catalyst may be a supported precious metal component which is effective to remove ammonia from an exhaust gas stream. The precious metal may include ruthenium, rhodium, iridium, palladium, platinum, silver, or gold. For example, the precious metal component includes physical mixtures or chemical or atomically-doped combinations of precious metals. The precious metal component for instance includes platinum. Platinum may be present in an amount of from about 0.008% to about 2 wt % based on the AMOx catalyst.

Figure 4:
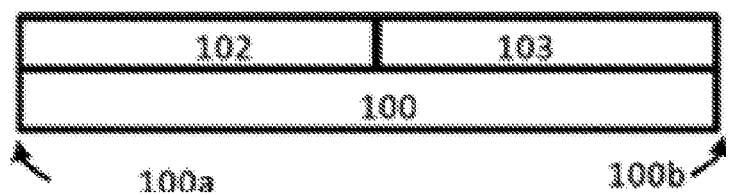
FIG. 4 is a schematic of an emission treatment system in which a washcoat composition of the present invention is utilized.

In some embodiments, the substrate can be coated with at least two layers contained in separate washcoat slurries in an axially zoned configuration. For example, the same substrate can be coated with a washcoat slurry of one layer and a washcoat slurry of another layer, wherein each layer is different, such as having a different overall composition. The two separate washcoat compositions may include separate catalyst compositions and may be substantially non-overlapping. For example, referring to FIG. 4, a first washcoat zone 102 including a washcoat of a first catalyst composition and a second washcoat zone 103 including a washcoat of a second, different catalyst composition can be located side by side along the length of the substrate 100. The first washcoat zone 102 of specific embodiments extends from the front or inlet end 100a of the substrate 100 through the range of about 5% to about 95%, from about 5% to about 75%, from about 5% to about 50%, or from about 10% to about 35% of the length of the substrate 100. The second washcoat zone 103 extends from the rear or outlet end 100b of the substrate 100 from about 5% to about 95%, from about 5% to about 75%, from about 5% to about 50%, or from about 10% to about 35% of the total axial length of the substrate 100. The catalyst compositions of at least two components within a treatment system as described in the current invention can be zoned onto the same substrate.

Figure 5:
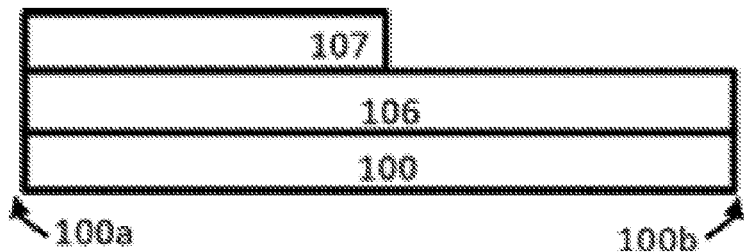
FIG. 5 is a schematic of an emission treatment system in which a washcoat composition of the present invention is utilized in forming a side-by-side coating.

In some embodiments, as seen in FIG. 5, a substrate 100 can be coated with a first coating layer 106 extending from the front or inlet end 100a of the substrate 100 to the rear or outlet end 100b of the substrate 100 and a second coating layer 107 that is coated over the first coating layer 106 proximate the front or inlet end 100a of the substrate 100 and extending across only a partial length of the substrate 100 (i.e., terminating before reaching the rear or outlet end 100b of the substrate 100).

Figure 6:
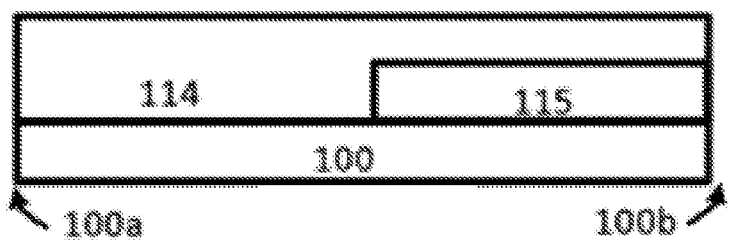
FIG. 6 is a schematic of an emission treatment system in which a washcoat composition of the present invention is utilized.

In some embodiments, as seen in FIG. 6, a substrate 100 can be coated with a first coating layer 115 proximate the rear or outlet end 100b of the substrate 100 and extending only partially along the length of the substrate 100 (i.e., terminating before reaching the front or inlet end 100a of the substrate 100). The substrate 100 can be coated with a second coating layer 114. As seen in FIG. 6, the second coating layer 114 extends from the front or inlet end 100a of the substrate 100 to the rear or outlet end 100b of the substrate 100 (and thus is coated completely over the first coating layer 115). It is understood that the embodiments above provided as examples, and further combinations of catalytic coatings are encompassed.

In one or more embodiments, a catalyst article according to the present disclosure specifically may comprise a substrate coated with a first coating layer as a bottom layer and a second coating layer as a top layer, wherein one or both of the first coating layer and the second coating layer include a binder composition as described herein. For example, a first coating layer or bottom coating layer may comprise at least a first binder and a second binder (and optionally a third binder) as described above. A second coating layer or top layer may comprise a binder composition as described herein but may, in some embodiments, include fewer binders than present in the first coating layer.

In describing the quantity of washcoat or catalytic metal components or other components of the composition, it is convenient to use units of weight of component per unit volume of catalyst substrate. Therefore, the units, grams per cubic inch ("g/in$^3$") and grams per cubic foot ("g/ft$^3$") are used herein to mean the weight of a component per volume of the substrate, including the volume of void spaces of the substrate. Other units of weight per volume such as g/L are also sometimes used. The total loading of a catalyst composition on the catalyst substrate, such as a monolithic flow-through substrate, is typically from about 0.1 to about 6 g/in$^3$, and more typically from about 1 to about 5 g/in$^3$. It is noted that these weights per unit volume are typically calculated by weighing the catalyst substrate before and after treatment with the catalyst washcoat composition, and since the treatment process involves drying and calcining the catalyst substrate at high temperature, these weights represent an essentially solvent-free catalyst coating as essentially all of the water of the washcoat slurry has been removed. As such, the foregoing values may represent the dry gain or the amount of solids present on the substrate after removal of any solvent or other liquid material present in the original washcoat slurry used to apply the solids to the substrate.

In some embodiments, it can be beneficial to utilize a first binder and a second binder (and optionally further binders) as described herein in concentrations and ratio to achieve a dry gain in one or more coating layers wherein the first binder and the second binder (and any optional, further binders) make up a desired weight ratio of the total dry gain. For example, in certain embodiments, a first binder having a relatively larger mean particle size can form a lesser weight percentage (e.g., 0 wt % to about 5 wt %, 0 wt % to about 2.5 wt %, about 0.1 wt % to about 5 wt %, about 0.2 wt % to about 4 wt %, or about 0.25 wt % to about 3 wt %) of the dry gain in a given coating layer, and a second binder having a relatively smaller mean particle size can form a greater weight percentage (e.g., about 7 wt % to about 20 wt %, about 10 wt % to about 15 wt %) of the dry gain in the same, given coating layer (all of the foregoing weight percentages being based on the total weight of dry gain of the given coating layer). In further examples, the weight percent of the first binder having the relatively larger mean particle size present in a coating layer based on the total weight of dry gain of the coating layer can be less than 5 wt %, less than 3 wt %, or less than 2.5 wt %, which can be inclusive of zero or can be defined with a minimum of at least 0.01 wt %. Additionally or alternatively, the weight percent of the second binder having the relatively smaller mean particle size present in the coating layer based on the total weight of dry gain of the coating layer can be greater than 7 wt %, greater than 8 wt %, greater than 9 wt %, or greater than 10 wt % (e.g., up to a maximum of about 25 wt % or about 20 wt %).

A catalyst material can be milled to enhance mixing of the catalyst particles and formation of a homogenous material. The milling can be accomplished in a ball mill, continuous mill, or other similar equipment. In one embodiment, the post-milling catalyst material is characterized by a D90 particle size of about 5 to about 40 microns, preferably 5 to about 30 microns, more preferably about 5 to about 10 microns. The D90 is defined as the particle size at which 90% of the particles have a finer particle size.

The washcoat slurry including the binder material alone or in combination with one or more dedicated catalyst materials can be coated on the catalyst substrate using a washcoat technique known in the art. In one embodiment, the catalyst substrate is dipped one or more times in the slurry or otherwise coated with the slurry. Thereafter, the coated substrate is dried at an elevated temperature (e.g., 100-150° C.) for a period of time (e.g., about 10 minutes to about 3 hours) and then calcined by heating, e.g., less than 700° C., typically for about 10 minutes to about 8 hours.

The temperature during calcination of coated catalyst substrate is less than about 700° C. In some embodiments, the calcining temperature ranges from about 300° C. to about 700° C., about 300° C. to about 500° C., about 350° C. to about 500° C., about 400° C. to about 500° C., or from about 450° C. to about 500° C. for a period of time. In some embodiments, the calcining temperature is less than about 700° C., about 600° C., about 500° C., about 450° C., about 400° C., or about 350° C. with a lower boundary of 300° C. In some embodiments, the period of time for calcination ranges from about 10 minutes to about 8 hours, about 1 to about 6 hours, or from 3 hours to about 6 hours (i.e., less than 8 hours, 7 hours, 6 hours, 5 hours, 4 hours, 3 hours, 2 hours, or 1 hour with a lower boundary of about 10 minutes).

Following drying and calcining, the final washcoat coating layer can be viewed as essentially solvent-free. After calcining, the catalyst loading can be determined through calculation of the difference in coated and uncoated weights of the substrate. As will be apparent to those of skill in the art, the catalyst loading can be modified by altering the slurry rheology. In addition, the coating/drying/calcining process to generate a washcoat can be repeated as needed to build the coating to the desired loading level or thickness, meaning more than one washcoat layer may be applied. For example, in some embodiments, the catalyst composition can be applied as a single layer or in multiple layers. In one embodiment, a catalyst material combined with a binder material as described herein can be applied in a single layer (e.g., only layer 14 of FIG. 2). In another embodiment, a catalyst material combined with a binder material as described herein can be applied in multiple layers (e.g., layers 14 and 16 of FIG. 2).

In some embodiments, the calcined coated substrate is aged. Aging can be conducted under various conditions and, as used herein, "aging" is understood to encompass a range of conditions (e.g., temperature, time, and atmosphere). Exemplary aging protocols involve subjecting the calcined coated substrate to a temperature of 650° C. for about 50 hours in 10% steam, 750° C. for about 5 hours in 10% steam, or to a temperature of 800° C. for about 16 hours in 10% steam. However, these protocols are not intended to be limiting and the temperature can be lower or higher (e.g., including but not limited to, temperatures of 400° C. and higher, e.g., 400° C. to 900° C., 600° C. to 900° C., or 650° C. to 900° C.); the time may be lesser or greater (e.g., including but not limited to, times of about 1 hour to about 50 hours or about 2 hours to about 25 hours); and the atmosphere can be modified (e.g., to have different amounts of steam and/or other constituents present therein).

The present disclosure also provides an emission treatment system that incorporates one or more compositions as described herein. A binder composition as described herein (alone or in combination with one or more dedicated catalyst materials) can be used in an integrated emissions treatment system comprising one or more additional components for the treatment of exhaust gas emissions, e.g., exhaust gas emissions from a gasoline engine.

Figure 7:
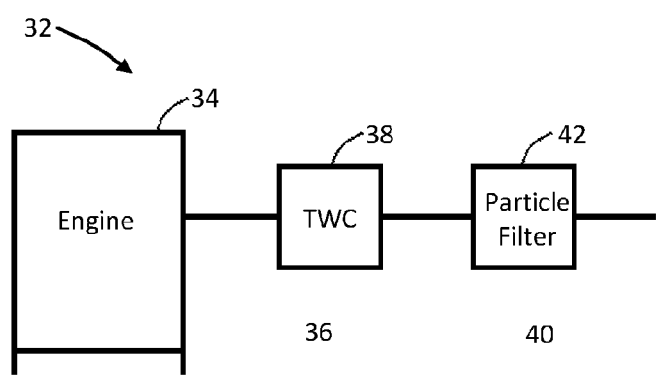
FIG. 7 is a schematic of an emission treatment system in which a washcoat composition of the present invention is utilized and which includes an optional particle filter.

One exemplary emissions treatment system is illustrated in FIG. 7, which depicts a schematic representation of an emission treatment system 32. As shown, an exhaust gas stream containing gaseous pollutants and is conveyed via exhaust pipe 36 from an engine 34 to a TWC catalyst component 38 then in pipe 40 to a particle filter component 42 that also is optionally coated with a TWC. One or both of the TWC catalyst component 38 and the particle filter component 42 can include a binder composition as described herein.

Exemplary embodiments are as follows.
1. A binder composition comprising:
   a first binder material formed of a plurality of particles having a first mean particle size; and
   a second binder material formed of a plurality of particles having a second mean particle size;
   wherein a ratio of the first mean particle size to the second mean particle size is about 2 or greater.
2. The binder composition of embodiment 1, wherein the first binder material and the second binder material are independently selected from the group consisting of alumina-containing materials, silica-containing materials, zirconia-containing materials, ceria-containing materials, lanthana-containing materials, yttria-containing materials, and combinations thereof.
3. The binder composition of any of embodiments 1-2, wherein the first binder material is an alumina-containing material, and the second binder material is a zirconia-containing material.
4. The binder composition of any of embodiments 1-3, further comprising a third binder material formed of a plurality of particles having a third mean particle size, wherein a ratio of the third mean particle size to the first mean particle size is about 2 or greater, or wherein a ratio of the second mean particle size to the third mean particle size is about 2 or greater.
4a. The binder composition of any of embodiments 1-4, further comprising a third binder material formed of a plurality of particles having a third mean particle size, wherein a ratio of the first mean particle size to the third mean particle size is about 2 or greater.
5. The binder composition of any of embodiments 1-4a, wherein the first mean particle size is about 50 nm to about 1000 nm.
6. The binder composition of any of embodiments 1-5, wherein the second mean particle size is about 10 nm to about 500 nm.
7. The binder composition of any of embodiments 1-6, wherein the first binder material and the second binder material are present in a concentration ratio of about 0.01 to about 0.5.
8. The binder composition of any of embodiments 1-7, wherein one or both of the first binder material and the second binder material is catalytic.
9. A washcoat slurry comprising:
   a liquid medium;
   a binder composition according to any one of embodiments 1 to 8.
10. The washcoat slurry of embodiment 9, wherein the binder composition is present in an amount of about 0.01 to about 1.0 g/in$^3$, and wherein the washcoat slurry has a viscosity at about 300 s$^{-1}$ of about 100 cP or less.

11. The washcoat slurry of any of embodiments 9-10, wherein the washcoat slurry has a viscosity at about 300 s$^{-1}$ of about 50 cP or less.
12. The washcoat slurry of any of embodiments 9-11, further comprising a catalyst material.
13. A catalyst article comprising a catalyst substrate having a plurality of channels adapted for gas flow, each channel having a wall surface in adherence to a catalytic coating comprising a binder composition according to any one of embodiments 1-8.
14. The catalyst article of embodiment 13, wherein the catalytic coating comprises a catalyst material in combination with the binder composition.
15. The catalyst article of any of embodiments 13-14, wherein the catalyst substrate is a honeycomb comprising a wall flow filter substrate or a flow through substrate.
16. The catalyst article of any of embodiments 13-15, wherein the catalytic coating is present on the substrate with a loading of at least about 1.0 g/in$^3$.
17. The catalyst article of any of embodiments 13-16, wherein the catalyst substrate includes a first coating layer of the catalytic coating and includes a second coating layer of a different overall composition overlying at least a portion of the first coating layer of the catalytic coating.
18. The catalyst article of any of embodiments 13-17, wherein one or both of the following conditions is met:
    the first binder material is present in an amount of about 0.1 wt % to about 5 wt % of a total dry gain of the first coating layer of the catalytic coating;
    the second binder material is present in an amount of about 7 wt % to about 20 wt % of the total dry gain of the first coating layer of the catalytic coating.
19. An emission treatment system for treatment of an exhaust gas stream, the emission treatment system comprising:
    i. an engine producing an exhaust gas stream; and
    ii. a catalyst article according to any one of embodiments 13 to 18 positioned downstream from the engine and in fluid communication with the exhaust stream.
20. The catalyst article of any one of embodiments 13-18, wherein a washcoat total mass loss is less than 6%.
21. The binder composition of any one of embodiments 1-8, wherein when binder composition is part of a washcoat, a washcoat total mass loss is less than 6%.
22. The washcoat slurry of any one of embodiments 9-12, wherein when the slurry is coated on a substrate, a washcoat total mass loss is less than 6%.

Examples

Aspects of the present invention are more fully illustrated by the following examples, which are set forth to illustrate certain aspects of the present invention and are not to be construed as limiting thereof.

Testing was carried out to evaluate the effect of varying ratios of binder components on properties of washcoat compositions and performance of coatings formed using the washcoat compositions. The washcoat compositions were prepared utilizing a first binder formed of a plurality of alumina particles having a mean particle size of about 78 nm, and utilizing a second binder formed of a plurality of ceria/zirconia particles having a mean particle size of about 28 nm and/or zirconia/yttria particles having a mean particle size of about 24 nm. That is, the second binder was a plurality of the ceria/zirconia particles or a plurality of the zirconia/yttria particles, or the second binder was a combination of a plurality of the ceria/zirconia particles and a plurality of the zirconia/yttria particles. The mean particle sizes of the binder components were measured by a dynamic light scattering using a Malvern Zetasizer Pro.

For each test sample, a first washcoat composition (for use as a bottom coat) was prepared as a slurry with a total solids content of approximately 2.172 g/in$^3$ formed of binders and catalysts. The first washcoat composition included both particles having the first, relatively larger mean particle size and particles having the second, relatively smaller mean particle size in the solids loadings shown in the Table below. A second washcoat composition (for use as a top coat) was also prepared as a slurry with a total solids content of approximately 1.366 g/in$^3$ formed of binders and catalysts. The second washcoat composition included the first binder particles (i.e., having the relatively larger mean particle size) in a solids loadings of 0.025 g/in$^3$ (1.83% by weight of the total solids content of the second washcoat) but did not include any of the second binder particles having the relatively smaller mean particle size. The viscosities of the first washcoat composition (for use as the bottom coating on a substrate) are likewise shown in the Table below.

The first washcoat composition and the second washcoat composition for each test sample was applied to a flow through substrate made of cordierite materials with a cell density of 600 cells per square inch and with a wall thickness of about 4.3 mm by dipping the flow through substrate in the slurry to a defined depth, applying a vacuum to draw the slurry up into the cells of the flow through substrate along at least a partial length of the substrate in a direction from a first end of the substrate to a second end of the substrate, removing the vacuum, rotating the flow through substrate 180°, and applying an air blast through the cells of the flow through substrate in a direct from the first end of the substrate to the second end of the substrate so that the slurry is coated across substantially the entire length of the substrate. Suitable methods for coating of a flow through substrate are provided in U.S. Pat. No. 7,521,087, the disclosure of which is incorporated herein by reference. The method involves coating the interior of a hollow substrate with a washcoat composition by partially immersing an end of the substrate into a vessel containing a bath of coating slurry and applying a vacuum to the partially immersed substrate at an intensity and time sufficient to draw the coating slurry upwardly from the bath into the interior of the hollow substrate. In the next step the substrate is rotated and a blast of air is applied to the end of the substrate which had been immersed into the slurry to distribute the washcoat composition therewithin. A bottom coating was applied using the first washcoat composition according to the method noted above and allowed to dry before applying a top coating using the second washcoat composition according to the method noted above.

The coated flow through substrates were subjected to washcoat loss testing to evaluate performance of the catalytic coatings including the binders at the various ratios. Severe multi-step washcoat adhesion testing was conducted on the catalyst comprising the binder package. The catalysts were each partitioned into three segments (top, middle, and bottom), and each segment was subjected to thermal shock steps, ultrasonic water bath steps, and air blowing steps to evaluate the adhesion of the catalyst washcoat under various conditions. In particular, catalyst segments were tested after heat/quench cycles at about 850° C. Wash coat adhesion (WCA) is shown in the table below as washcoat loss, which represents the washcoat adhesion percent loss (based on the difference between the catalyst segment mass before and after being subjected to the noted treatments). A washcoat total mass percent loss under these conditions of less than 6% was indicative of robust WCA.

Figure 8:
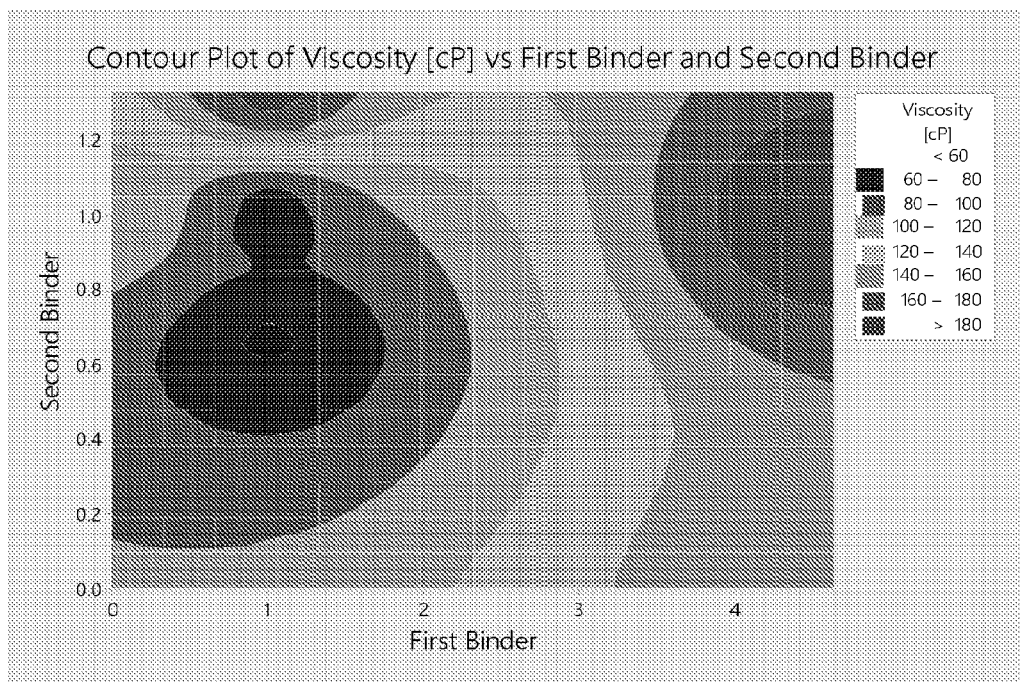
FIG. 8 is a contour plot showing viscosities (cP) of example washcoat compositions according to embodiments of the present disclosure based on relative loadings of particles of a first binder and particles of a second binder wherein the second binder (y axis) and first binder (x axis) are normalized loading relative to a baseline.
Figure 9:
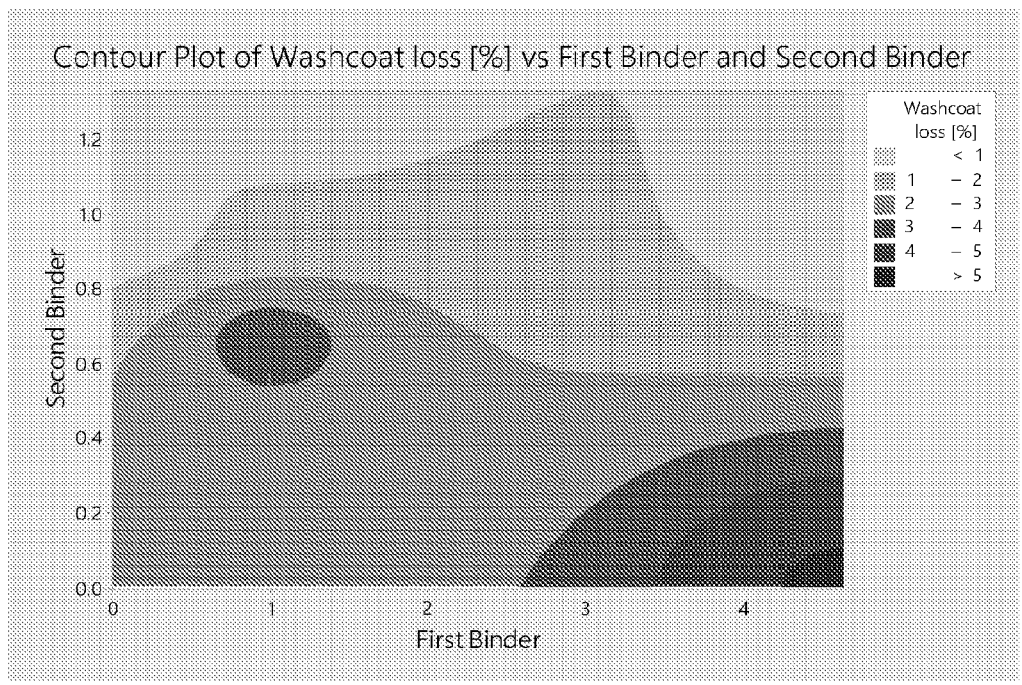
FIG. 9 is a contour plot showing loss percentage of an example washcoat according to embodiments of the present disclosure based on relative loadings of particles of a first binder and particles of a second binder used in making the compositions used to form the washcoats, wherein the second binder (y axis) and first binder (x axis) are normalized loading relative to a baseline.

A contour plot showing the viscosities of the first washcoat composition based on the relative loadings of the first binder material formed of particles of a relatively larger mean size and the second binder material formed of particles of a relatively smaller mean size is provided in FIG. 8. Viscosity was measured using a Brookfield viscometer at room temperature at a shear rate of about 300 s$^{-1}$. The figure shows that preferred, low viscosities are achieved using defined ratios of the first binder particles and the second binder particles. A contour plot showing the washcoat loss percentage based on the relative loadings of the first binder particles and the second binder particles is provided in FIG. 9. The figure shows that preferred, low washcoat losses are achieved using defined ratios of the first binder particles and the second binder particles.

Following the general procedure as above, the following examples were prepared.

| Test Sample | Second Binder[+] Loading (g/in$^3$) | Second Binder Conc. of First Wash Coat (wt. %) | First Binder Loading (g/in$^3$) | First Binder Conc. of First Wash Coat (wt. %) | First Wash Coat Viscosity at 300 1/s (cP) | Washcoat Loss at 850° C. (%) |
|---|---|---|---|---|---|---|
| Baseline | 0.2390 | 11.0 | 0.0108 | 0.5 | 71 | 1.1 |
| Ex. 1 | 0.1594 | 7.3 | 0.0108 | 0.5 | 58 | 3.4 |
| Ex. 2 | 0.3186 | 14.7 | 0.0108 | 0.5 | 188 | 0.2 |
| Ex. 3 | 0 | 0 | 0.05 | 2.3 | 155 | 5.1 |
| Ex. 4 | 0.2390 | 11.0 | 0.05 | 2.3 | 198 | 0.4 |
| Ex. 5 | 0.2390 | 11.0 | 0 | 0 | 115 | 0.1 |

[+]second binder was a combination of a plurality of the ceria/zirconia particles and a plurality of the zirconia/yttria particles.

Many modifications and other embodiments of the presently disclosed subject matter will come to mind to one skilled in the art to which this subject matter pertains having the benefit of the teachings presented in the foregoing descriptions and the associated drawings. Therefore, it is to be understood that the present disclosure is not to be limited to the specific embodiments described herein and that modifications and other embodiments are intended to be included within the scope of the appended claims. Although specific terms are employed herein, they are used in a generic and descriptive sense only and not for purposes of limitation.

What is claimed is:

1. A binder composition comprising:
   a first binder material formed of a plurality of particles having a first mean particle size;
   a second binder material formed of a plurality of particles having a second mean particle size; and
   a third binder material formed of a plurality of particles having a third mean particle size;
   wherein a ratio of the first mean particle size to the second mean particle size is about 2 or greater; and
   wherein a ratio of the first mean particle size to the third mean particle size is about 2 or greater.

2. The binder composition of claim 1, wherein the first binder material and the second binder material are each independently chosen from alumina-containing materials, silica-containing materials, zirconia-containing materials, ceria-containing materials, lanthana-containing materials, yttria-containing materials, and combinations thereof.

3. The binder composition of claim 1, wherein the first binder material is an alumina-containing material, and the second binder material is a zirconia-containing material.

4. The binder composition of claim 1, wherein the first mean particle size ranges from about 50 nm to about 1000 nm.

5. The binder composition of claim 1, wherein the second mean particle size ranges from about 10 nm to about 500 nm.

6. The binder composition of claim 1, wherein the first binder material and the second binder material are present in a concentration ratio of about 0.01 to about 0.5.

7. The binder composition of claim 1, wherein one or both of the first binder material and the second binder material is catalytic.

8. A washcoat slurry comprising:
   a liquid medium;
   a binder composition according to claim 1.

9. The washcoat slurry of claim 8, wherein the binder composition is present in an amount ranging from about 0.01 g/in$^3$ to about 1.0 g/in$^3$, and wherein the washcoat slurry has a viscosity ranging from about 300 s$^{-1}$ of about 100 cP or less.

10. The washcoat slurry of claim 9, wherein the washcoat slurry has a viscosity at about 300 s$^{-1}$ of about 50 cP or less.

11. The washcoat slurry of claim 8, further comprising a catalyst material.

12. A catalyst article comprising a catalyst substrate having a plurality of channels adapted for gas flow, wherein each channel has a wall surface in adherence to a catalytic coating comprising a binder composition according claim 1.

13. The catalyst article of claim 12, wherein the catalytic coating comprises a catalyst material in combination with the binder composition.

14. The catalyst article of claim 12, wherein the catalyst substrate is a honeycomb comprising a wall flow filter substrate or a flow through substrate.

15. The catalyst article of claim 12, wherein the catalytic coating is present on the substrate with a loading of at least about 1.0 g/in$^3$.

16. The catalyst article of claim 12, wherein the catalyst substrate includes a first coating layer of the catalytic coating and includes a second coating layer of a different overall composition overlying at least a portion of the first coating layer of the catalytic coating.

17. The catalyst article of claim 16, wherein one or both of the following conditions is met:
   the first binder material is present in an amount ranging from about 0.1 wt % to about 5 wt % of a total dry gain of the first coating layer of the catalytic coating;
   the second binder material is present in an amount ranging from about 7 wt % to about 20 wt % of the total dry gain of the first coating layer of the catalytic coating.

18. An emission treatment system for treatment of an exhaust gas stream, the emission treatment system comprising:
   i. an engine producing an exhaust gas stream; and
   ii. a catalyst article according to claim 12 positioned downstream from the engine and in fluid communication with the exhaust stream.

* * * * *